(12) United States Patent
Rana

(10) Patent No.: US 8,294,080 B2
(45) Date of Patent: Oct. 23, 2012

(54) VIEWING APPARATUS CAPABLE OF MOVING A SUBJECT WITHIN THE FIELD OF VIEW OF THE CENTER OF THE VIEWED IMAGE

(75) Inventor: Harbinder Rana, Sevenoaks (GB)

(73) Assignee: The Secretary of State for Defence in Her Britannic Majesty's Government of the United Kingdom of Great Britain and Northern Ireland (GB)

( * ) Notice: Subject to any disclaimer, the term of this patent is extended or adjusted under 35 U.S.C. 154(b) by 397 days.

(21) Appl. No.: 12/307,129

(22) PCT Filed: Jul. 4, 2007

(86) PCT No.: PCT/GB2007/002501
§ 371 (c)(1),
(2), (4) Date: Dec. 31, 2008

(87) PCT Pub. No.: WO2008/003967
PCT Pub. Date: Jan. 10, 2008

(65) Prior Publication Data
US 2009/0256949 A1   Oct. 15, 2009

(30) Foreign Application Priority Data
Jul. 4, 2006 (GB) .................................. 0613283.1

(51) Int. Cl.
*H01J 3/14* (2006.01)
*G02B 23/00* (2006.01)

(52) U.S. Cl. ....................................... 250/216; 359/431

(58) Field of Classification Search .................. 250/216; 359/423, 431
See application file for complete search history.

(56) References Cited

U.S. PATENT DOCUMENTS

| 4,039,246 A | | 8/1977 | Voigt |
| 5,483,362 A | | 1/1996 | Tai et al. |
| 5,964,432 A | * | 10/1999 | Obkircher ..................... 244/3.16 |
| 6,094,304 A | * | 7/2000 | Wallace et al. ............... 359/425 |

(Continued)

FOREIGN PATENT DOCUMENTS

GB   796406   6/1958

(Continued)

OTHER PUBLICATIONS

Office communication dated Jul. 1, 2011 in related European Patent Application No. 07733461.3.

(Continued)

*Primary Examiner* — Thanh Luu
(74) *Attorney, Agent, or Firm* — Dean W. Russell; Kristin M. Crall; Kilpatrick Townsend & Stockton LLP

(57) ABSTRACT

A viewing apparatus comprises one or more optical elements, which may be moved in order to redirect light entering the viewing apparatus such that a subject in any part of the field of view may be relocated to the center of the viewed image without moving the viewing apparatus itself. The viewing apparatus further comprises a relay lens group which conditions the light into a quasi-collimated state before it enters the optical elements allowing a more compact device to be produced. The viewing apparatus may additionally include a zoom lens mechanism to enable the viewed image to be enlarged.

21 Claims, 3 Drawing Sheets

U.S. PATENT DOCUMENTS

| | | | |
|---|---|---|---|
| 7,133,219 B1 * | 11/2006 | Whitty | 359/740 |
| 2004/0057656 A1 * | 3/2004 | Chu et al. | 385/17 |
| 2005/0039370 A1 | 2/2005 | Strong | |
| 2005/0213964 A1 | 9/2005 | Kreger et al. | |

FOREIGN PATENT DOCUMENTS

| GB | 2061545 | 5/1981 |
|---|---|---|
| GB | 2186993 | 8/1987 |
| JP | 6150696 A | 6/1994 |
| JP | 2002267936 A | 9/2002 |
| WO | WO 99/05468 | 2/1999 |

OTHER PUBLICATIONS

English translation of Notice of Rejection dated Mar. 27, 2012 in related Japanese Application No. 2009-517428.

* cited by examiner

VIEWING APPARATUS CAPABLE OF MOVING A SUBJECT WITHIN THE FIELD OF VIEW OF THE CENTER OF THE VIEWED IMAGE

CROSS REFERENCE TO RELATED APPLICATIONS

This application is the U.S. national phase of International Application No. PCT/GB2007/002501 filed on Jul. 4, 2007 and published in English on Jan. 10, 2008 as International Publication No. WO 2008/003967 A1, which application claims priority to Great Britain Application No. 0613283.1 filed on Jul. 4, 2006, the entire contents of both of which are incorporated herein by reference.

This invention relates to an improved viewing apparatus. More particularly, it relates to an improved viewing apparatus having a capability of viewing a subject which is situated away from the centre of its field of view and adjusting a viewed image of the subject such that the subject is relocated to the centre of the viewed image, whilst permitting the viewing apparatus itself to remain stationary.

Such viewing apparatus are suitable for use in any viewing system where it is desirable to scan across a field of view without the need to move the apparatus. One such application would be the surveillance or Closed Circuit Television (CCTV) cameras that are used to follow a subject's movements. Other applications exist in the field of inspection, for example in the "down well" inspections carried out in the oil and gas industry or inspection carried out during Non Destructive Testing (NDT) activities.

Viewing apparatus are known which enable the centre of a viewed image to be moved without moving the viewing apparatus itself. In patent application GB 2186993, British Nuclear Fuels Plc (BNF) provide a viewing apparatus for viewing in pipework or in radioactive cells. This viewing apparatus comprises a camera used in combination with one or more prisms, said prisms being moveable in order to change the field of view of the system angularly.

BNF teaches that these prisms must be placed in front of the optics at the first end of the apparatus where the incident light is received into the system. For the purposes of this specification, the "first end" of a lens assembly shall be defined as the extremity of the lens assembly at which incident rays from the subject enter the lens assembly. Similarly, the "second end" of the viewing apparatus is defined as that extremity of the lens assembly at which the image of the subject is produced for viewing. The reason for this positioning of the prisms is that the state of the art teaches that the prisms will only operate effectively in fully collimated light. This is because when light is received by the prisms at an angle of incidence other than the normal, the light rays are refracted to a different degree depending on their wavelength. This leads to undesirable image distortion and chromatic aberrations which may be observed as colour splitting.

However, the positioning of the prisms at the first end of the apparatus provided by BNF has the disadvantage that it requires the prisms to be very large if they are to be able to image a practically sized field of view instantaneously. This limitation in the apparatus means that it is unsuitable for many applications in fields such as surveillance and inspection in which space is often a key consideration.

Further apparatus are known in which movement of an image is achieved by moving the apparatus itself by means of mechanical actuators. Such apparatus generally take the form of cameras which are equipped with a number of motors to enable them to pan and/or tilt to the desired orientation. Devices of this kind avoid the need for the large prisms that are required by BNF; indeed they avoid the need to use prisms for re-directing the light at all. However they are mechanically complex and therefore bulky and expensive.

A further problem occurs when there is a need to use the viewing apparatus to observe a subject through a hole in a barrier. Such a need arises in many different situations. One such situation is surveillance, when it is wished to observe a person without that person's knowledge. In this circumstance, the barrier may be a wall, with the camera embedded within the wall. A second situation is inspection within the casing of a delicate item such as a suspected bomb in order to determine enough information on the bomb's construction to enable it to be successfully defused, whilst ensuring minimal disruption to the bomb casing. In this second circumstance, the barrier would typically be the casing.

The use of a conventional viewing system such as those described above in these situations would result in severe vignetting of the image as a result of the periphery of the hole impinging on the field of view. This problem would be particularly pronounced when using the system provided by BNF since such large prisms are required to capture a practical field of view. To obtain good quality images with a system of this type the hole would need to be made very large which is simply not feasible in many cases.

Furthermore the effect of this vignetting increases dramatically as the distance between the hole and the viewing apparatus (the "stand off" distance) is increased. This presents a serious problem in applications where a large stand off distance is desirable. For instance a large stand off distance is advantageous when placing hidden surveillance cameras as it reduces the risk of the camera being seen and discovered.

In addition, when a camera employing a mechanical pan and tilt mechanism is used, the hole in the barrier would have to be enlarged to allow for the movement of the camera. Such enlargement of the hole is extremely disadvantageous. For example in surveillance applications the enlargement of the hole significantly increases the probability that the camera will be detected. In bomb disposal applications enlargement of the hole may have even more serious consequences as it increases the risk of causing an explosion.

The invention overcomes these problems with the prior art by providing a novel arrangement of lenses which enables the viewing apparatus to be contained in a much more compact space.

A further advantage of the invention is that it overcomes the problems associated with viewing a subject through a hole in a barrier by providing means for projecting a real image of an internal aperture stop forwards into object space thus creating a stationary external entrance pupil in front of the lens assembly.

The present invention therefore provides a viewing apparatus comprising a first end for receiving incident light from within a field of view and being adapted to produce a focussed image on an image plane at a second end of the viewing apparatus, the viewing apparatus further comprising one or more optical elements that may be moved so that light from anywhere within the field of view of the viewing apparatus can be redirected to the optical axis thus moving the field of view without moving the viewing apparatus itself, characterised in that, the viewing apparatus comprises a relay lens group at the first end of the viewing apparatus operable in use to condition the light to a quasi-collimated state prior to it being incident on the one or more optical elements.

The viewing apparatus may include a camera, binoculars or a telescope. The apparatus may comprise conventional lens elements or groups of such elements of the type commonly found in the lenses of conventional video/still cameras. Preferably, the viewing apparatus further comprises an image receiving apparatus located on the image plane. The image receiving apparatus may be any means suitable for receiving an image, such as photographic film, a digital or analogue imaging sensor or an eye. It is also possible to envisage a device that employs a combination of two or more of these image receiving apparatus.

In order to overcome the problems with the prior art and to produce a viewing apparatus that may be contained in a more compact space, it is necessary to reduce the size of the optical components that are used. However, reduction in the size of the optical components in prior art arrangements such as that proposed by BNF leads to a greatly reduced field of view due to the need to position the optical elements in collimated space at the first end of the viewing apparatus. Reduction in the size of the optical components also leads to increased aberrations and distortions and thus damages image quality.

In the present invention however, the inventor has found that contrary to the teachings of the prior art, if the light entering the optical elements is in fact not fully collimated but only nearly or quasi-collimated, the size and complexity of the optical components of the viewing apparatus can be greatly reduced. The introduction of quasi-collimated light to the optical elements can be achieved by placing a relay lens arrangement at the first end of the viewing apparatus in front of the optical elements.

According to the invention therefore the relay lens group located at the first end of the viewing apparatus will have a small amount of optical power such that it conditions the collimated incident light to produce light in a state of near or quasi-collimation. Since it is then not necessary to maintain complete collimation of the light, further processing of the beam may be dramatically simplified.

The relay lens group can therefore be said to condition the beam for entry into the subsequent optical elements. This conditioning of the beam enables much smaller optical elements to be used to control the movement of the field of view than has been possible in the prior art whilst retaining the ability to image a field of view of up to 180° instantaneously. It will also be recognised that the relay lens group itself may also be made much smaller and less complex than an equivalent group that is required to fully collimate the light.

The use of such small optical elements enables very small cameras to be produced which has distinct advantages in many fields such as hidden surveillance cameras.

The relay group may be produced using known optical arrangements and may advantageously comprise a Keplerian telescope modified to produce near collimated rather than fully collimated light. A Keplerian telescope type arrangement is preferable to a traditional Gaussian telescope type arrangement as it produces an internal focal plane, thus enabling the telescope to be more compact.

The aberrations produced due to the light not being entirely collimated on entry to the optical elements may be corrected within the optical elements themselves or by a conditioning lens or group of lenses which the light enters after being manipulated by the optical elements. It will be understood that this correction may be done in any known way, however it will also be clear that the degree of "non-collimation" of the light is critical to the operation of the invention.

To produce good results the light exiting the relay group should exhibit a numerical aperture (NA) of less than or equal to 0.03 and preferably between 0.03 and 0.017. For numerical apertures greater than 0.03 the angle of the light incident on the optical elements is too great and it is not practical to correct the chromatic aberrations and distortion that this introduces. Equally, for numerical apertures significantly smaller than 0.017, the beam approaches the fully collimated state and the advantages of processing near-collimated light are progressively lost, leading to an increase in the size of the apparatus.

Particularly good results have been achieved using a numerical aperture of between 0.028 and 0.022, with significant testing having been carried out at a nominal value of NA=0.025.

The person skilled in the art will understand that the invention applies equally to positive or negative values for numerical aperture.

Whilst it may be advantageous in terms of the size of the optical elements to also use the relay lens group to reduce the size of the incident light beam prior to (quasi) collimation; it will be appreciated that the invention may be operated independently of the degree of magnification produced by the relay group. Indeed the advantages of working with quasi-collimated light may be realised with an incident beam that is convergent or divergent and magnified or de-magnified.

The movement of the one or more optical elements avoids the need for the housing to itself pan and/or tilt in order to adjust the viewed image so that a subject situated away from the centre of the field of view is relocated to the centre of the viewed image.

Preferably, the one or more optical elements that are used to redirect the incident rays comprise one or more Risley prisms (also known as Herschel prisms). A Risley prism comprises an assembly of two wedge prisms which may be manipulated independently or in combination to deviate the optical axis of the light passing through them via refraction of the light. In the present invention this effect is used to re-direct the incident ray as it is directed through the lens assembly such that a subject which is initially situated away from the centre of the field of view can be relocated to the centre of the viewed image. This may be achieved for example by rotating the wedge prisms of the Risley prism relative to one another about the centre line of the apparatus.

The use of Risley prisms has the advantage of enabling the field of view to be scanned in a Cartesian sense, i.e. left to right and/or top to bottom. In an alternative embodiment of the present invention, the one or more optical elements may comprise an arrangement of mirrors, which can be used to redirect the incident rays via reflection of the light. However, a camera employing such an arrangement would occupy a larger enclosed volume than one employing a Risley prism. It is also possible to produce the desired angular deviation of the incident rays by employing a single element lens and moving this lens in a plane perpendicular to the optical axis. However, the use of this technique leads to degradation in image quality far greater than that experienced when using Risley prisms or mirrors.

Preferably, at least one of the wedges of the Risley prisms is comprised of two or more elements, each element being formed from a material of different refractive index. This aspect of the present invention assists in reducing chromatic aberrations when compared with the use of materials of a common refractive index because it allows the lens assembly to be designed so that the aberrations introduced by a first element are compensated for by those introduced by a second element. The construction of the Risley prisms can therefore also be used to compensate for the chromatic aberrations introduced by the use of quasi-collimated rather than fully collimated light.

As mentioned above it is preferable that once the light exits the optical elements it passes through a conditioning lens or group of lenses which are used to correct any remaining aberrations introduced by the relay group or the optical elements.

Advantageously, the lens assembly further comprises a zoom apparatus for magnifying the images produced. In this case the conditioning lens may be incorporated within the zoom apparatus, although this is not essential. A zoom apparatus provides the advantage of permitting the focal length of the lens assembly to be varied so that the adjusted image of the subject can be enlarged or reduced in size. When used in combination with the movement of the optical elements as described above, this enables the viewing apparatus to zoom into and move between any point within the maximum field of view of the system.

The use of a conditioning lens or group of lenses as described above in combination with the zoom apparatus provides the advantage of enabling both the optical elements and the zoom apparatus to be operated simultaneously without any loss of image quality. This is because the conditioning lens or group corrects the aberrations introduced by the optical elements before the light is processed by the zoom apparatus.

The zoom apparatus may preferably comprise two or more groups of lens elements and may be operable by linear relative movement between the two or more groups. In conventional zoom lenses with two or more groups of lens elements, the two or more groups are movable relative to each other in a non-linear manner to minimise movement of the focal plane of the lens assembly and thereby ensure that the viewed image remains in focus. However, whilst there is some degradation of the absolute image quality achievable by using a linear movement of the lenses rather than a conventional non-linear movement, this does not present a significant problem. In practice, where an imaging sensor is used, no loss in image quality will be perceived as any degradation of the image can be controlled to be at a level below that which the sensor is capable of detecting. Linear movement of the two or more groups has the advantage of reducing the complexity of the internal workings of the camera, thereby enabling the size of the viewing apparatus to be kept to a minimum and permitting the viewing apparatus to be employed in confined spaces. Employing this linear relative movement permits the construction of viewing apparatus, such as a camera, occupying enclosed volumes as small as 150 cm$^3$, with the volume of the lens arrangement itself being only 100 cm$^3$.

Advantageously, the zoom assembly is detachable thereby permitting a user of the viewing apparatus to select the zoom apparatus that is most appropriate for the subject being observed.

In a further embodiment of the invention the zoom apparatus may be provided by a "solid state" zoom device. A solid state zoom comprises one or more lenses and is provided with means by which to change the geometry of these lenses in order to control the magnification they produce.

It will be appreciated that any known configuration of zooming apparatus may be used in combination with the viewing apparatus of the invention, provided that it enables a user to zoom in on their selected portion of the field of view.

It is preferable for the viewing apparatus to further comprise an aperture stop to limit the size of the entrance pupil of the system. This aperture stop may advantageously be provided within the zoom apparatus if one is being used. Providing the aperture stop within the zoom apparatus reduces image distortion at high zoom magnifications. However, if no zoom apparatus is to be used the aperture stop may be provided in the conditioning lens or in a further fixed focus lens or group of lenses preferably located between the movable optical elements and the image plane.

A further advantage provided by the invention is that the relay lens group also acts to project a real image of the aperture stop forwards from the first end of the viewing apparatus into "object space". In this specification the term "object space" is used to refer to that space in front of the first end of the viewing apparatus in which the subject being viewed is located.

Projecting the aperture stop forwards into object space creates an entrance pupil at a certain distance in front of the first end of the viewing apparatus, said entrance pupil acting to limit the amount of light that can enter the system. Preferably this entrance pupil will remain stationary during the operation of the viewing apparatus, even when the optical elements or zoom apparatus are being moved. This may be achieved by careful selection of the geometry of the lenses used.

The production of a stationary external entrance pupil enables the centre of the field of view as imaged by the apparatus to be pivoted about the entrance pupil using the moveable optical elements described above, thus allowing the apparatus to scan across the maximum field of view.

This aspect of the present invention thus makes it particularly suitable for viewing a subject through a hole in a barrier as described above. This is because the external entrance pupil enables the size of the viewed image to be maximised whilst avoiding any vignetting caused by the periphery of the hole in the barrier. The forward projection of a real image of the aperture stop also reduces the sensitivity of the image quality produced by the viewing apparatus to changes in the size, shape and quality of the hole used. This is because the size of the entrance pupil is limited by the image of the aperture stop that has been projected forward by the optical relay apparatus, rather than by the hole itself.

Projection of the aperture stop forwards from the first end of the lens assembly also allows the outermost extremity of the first end of the viewing apparatus to be offset from the hole without suffering degradation in the image quality obtained. In other words it allows the stand off distance of the system to be increased. Good results can be achieved by locating the viewing apparatus such that the hole in the barrier and the external entrance pupil are substantially coincident. Preferably, the viewing apparatus of the present invention will project the entrance pupil forwards into object space by a distance in the range of 2 to 4 millimetres.

The hole in the barrier may be of any shape or size. The size of the hole is in practice limited only by the light sensitivity of the means used to receive the image and may therefore be tailored to provide optimum performance of the particular components used. However it will be recognised that the present invention has the advantage that the image quality obtained is, within usable limits, insensitive to the size and shape of the hole.

In order to provide effective imaging in typical ambient conditions and to reduce adverse effects on the imagery of the viewing apparatus—such as vignetting of the viewed image—it has been found that the hole may advantageously have a diameter which provides a relative aperture in the range of F/7 to F/12. Nevertheless in bright conditions, such as a sunny summer's day a relative aperture of F/15 may be used. For the purpose of the present invention, 'diameter' is defined as the size of the minor axis of the hole. It has been found that a hole with a diameter in the range of 0.8 to 1.0 millimetres may usefully be employed to provide good quality imagery whilst minimising the impact of making the hole in the barrier. In very bright conditions the diameter of the hole can be reduced even further, to be as small as 0.3 millimetres.

As mentioned above the viewing apparatus may have a field of view of up to 180°. However it should be noted that the maximum stand off distance achievable by the viewing apparatus will be reduced as the maximum field of view is increased.

By way of example, an embodiment of the present invention, adapted for use in a surveillance camera located behind a hole in a barrier will now be described. Reference will be made to the accompanying drawings, in which.

Figure 1:
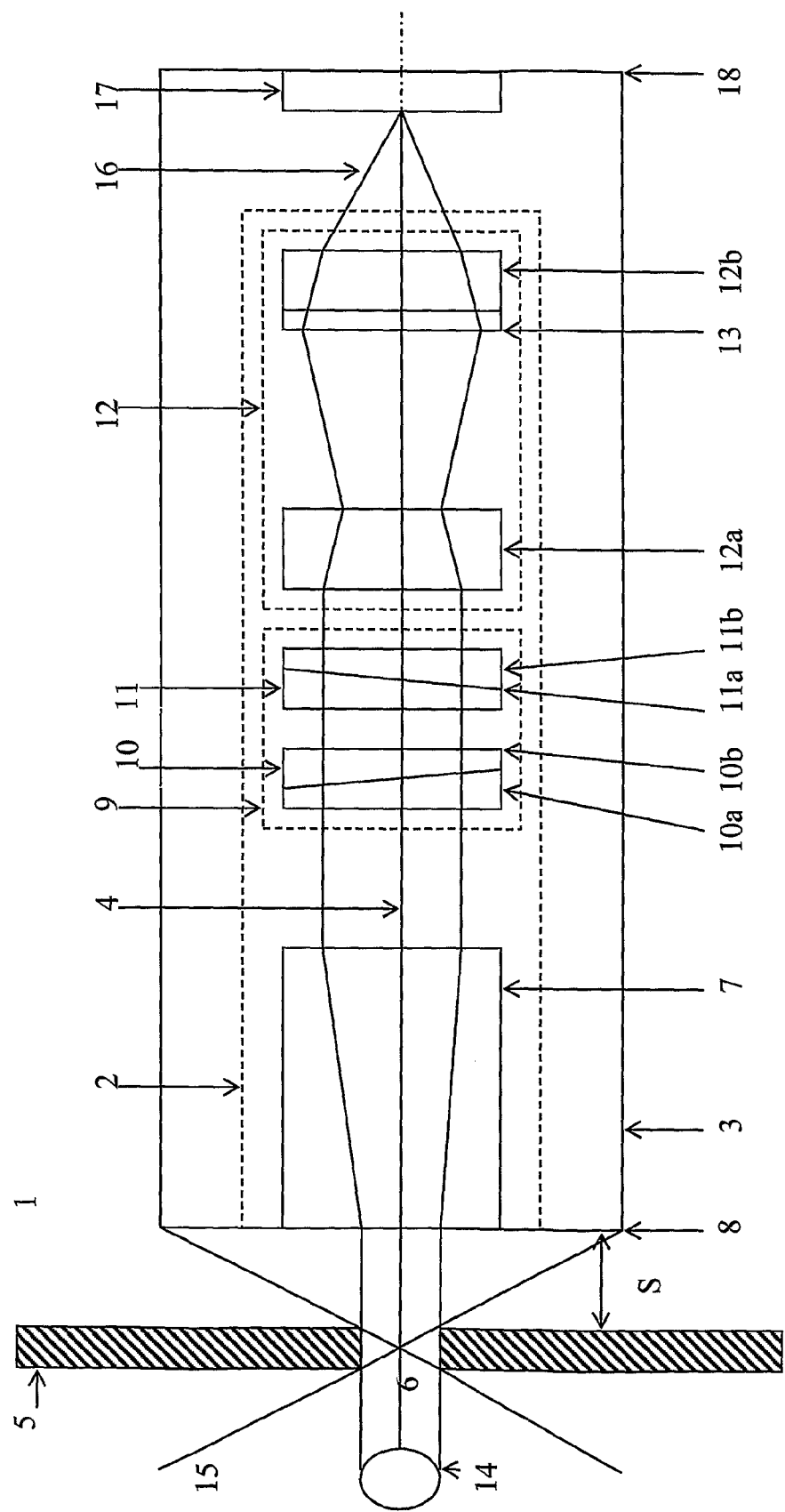
FIG. 1 shows a cross section view of a camera as per the present invention.

A camera (1) comprises a lens assembly (2) located within a housing (3). The lens assembly (2) has an optical axis (4). In use, the camera is located behind a barrier (5), with the camera (1) having a standoff distance (S) in this embodiment of 2 millimetres. The barrier incorporates a hole (6) having a diameter in this embodiment of approximately 1 mm. The lens assembly (2) comprises a relay lens group (7) located at the first end (8) of the camera (1). This relay lens group (7) comprises a Keplerian telescope type lens configuration and acts to focus the light at an internal focal plane and then to substantially but not fully collimate the light such that the rays exiting the relay lens group (7) are quasi-collimated. The numerical aperture of the light exiting the relay lens group (7) in this embodiment of the invention is approximately 0.025. The relay lens group (7) therefore conditions the light beam so that the subsequent optical elements in the apparatus may be made more compact. This conditioned light leaving the relay lens group (7) then enters a Risley prism (9). The Risley prism (9) comprises two separate wedge prisms (10, 11). The two wedge prisms (10, 11) being rotatable either together or independently relative to one another in order to redirect rays of light entering the lens assembly (2) from anywhere within the field of view (15) of the lens assembly (2) such that the field of view (15) may be moved. Each of these wedge prisms (10, 11) are comprised of two further optical elements (10a, 10b, 11a 11b) which are joined together in pairs to form the two wedge prisms (10, 11) and are formed of materials having different refractive indexes in order to reduce the occurrence of aberrations. The lens assembly (2) further comprises a zoom apparatus (12) having two groups of lens elements (12a, 12b) which are moveable relative to each other along the optical axis (4). Lens group (12a) of the zoom apparatus (12) acts as a conditioning lens group and is adapted to correct any remaining aberrations introduced by the relay lens group (7) or the Risley prism (9). Lens group (12b) of the zoom apparatus (12) additionally includes an aperture stop (13). A real image of this aperture stop (13) is projected forward into object space via the relay lens group (7) in order to produce a stationary external entrance pupil to limit the amount of light that may enter the lens assembly (2). The camera (1) is situated relative to the hole (6) in the barrier (5) such that the external entrance pupil substantially coincides with the hole (6) in order to prevent any negative impact on the image quality due to the shape or quality of the hole (6). The camera is further located relative to the hole (6) such that a subject (14) is situated within the field of view (15) of the lens assembly (2).

Figure 2:
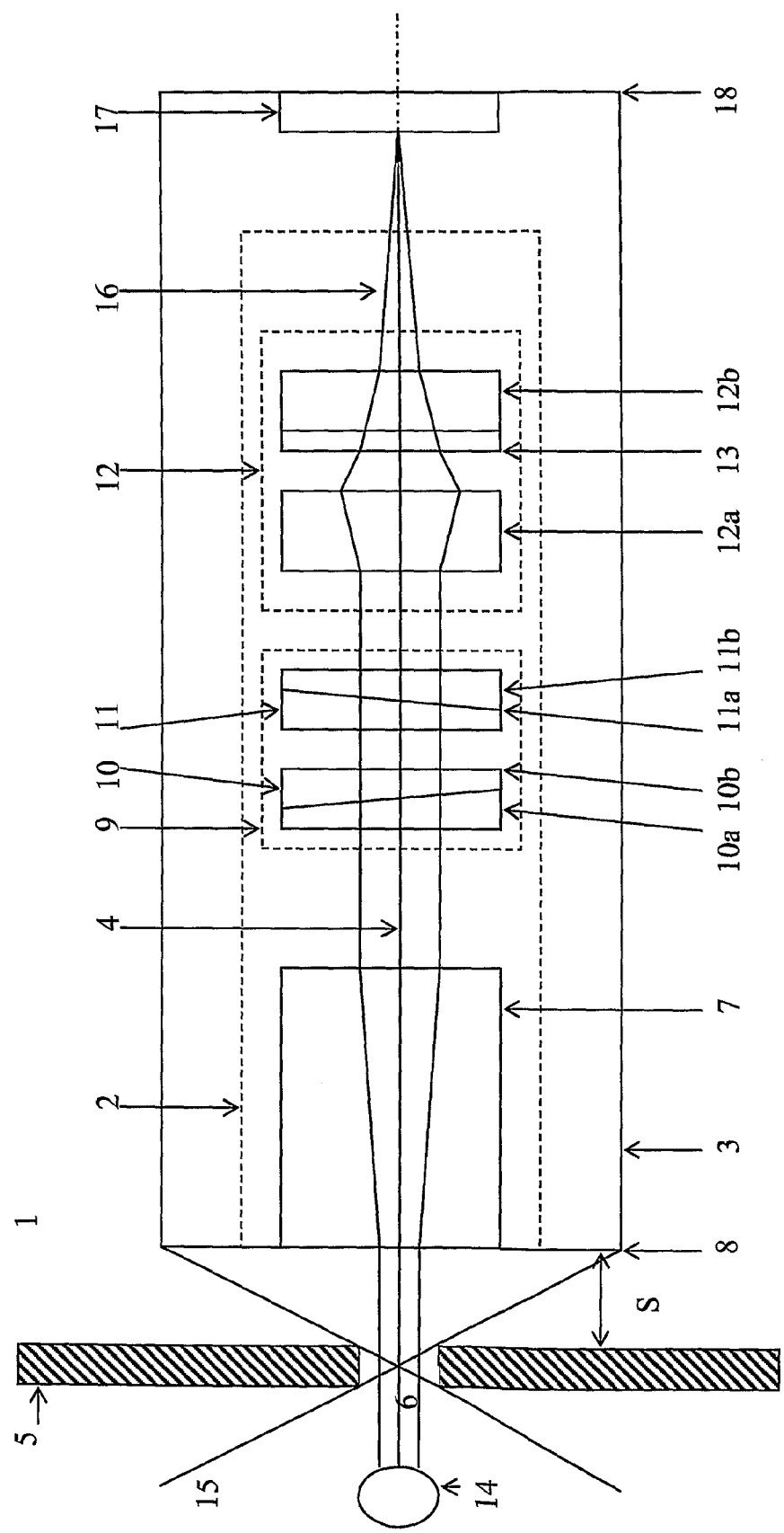
FIG. 2 shows a second cross section view of the camera of FIG. 1, displaying the effect of relative movement of two groups of lens elements that comprise the zoom apparatus.
Figure 3:
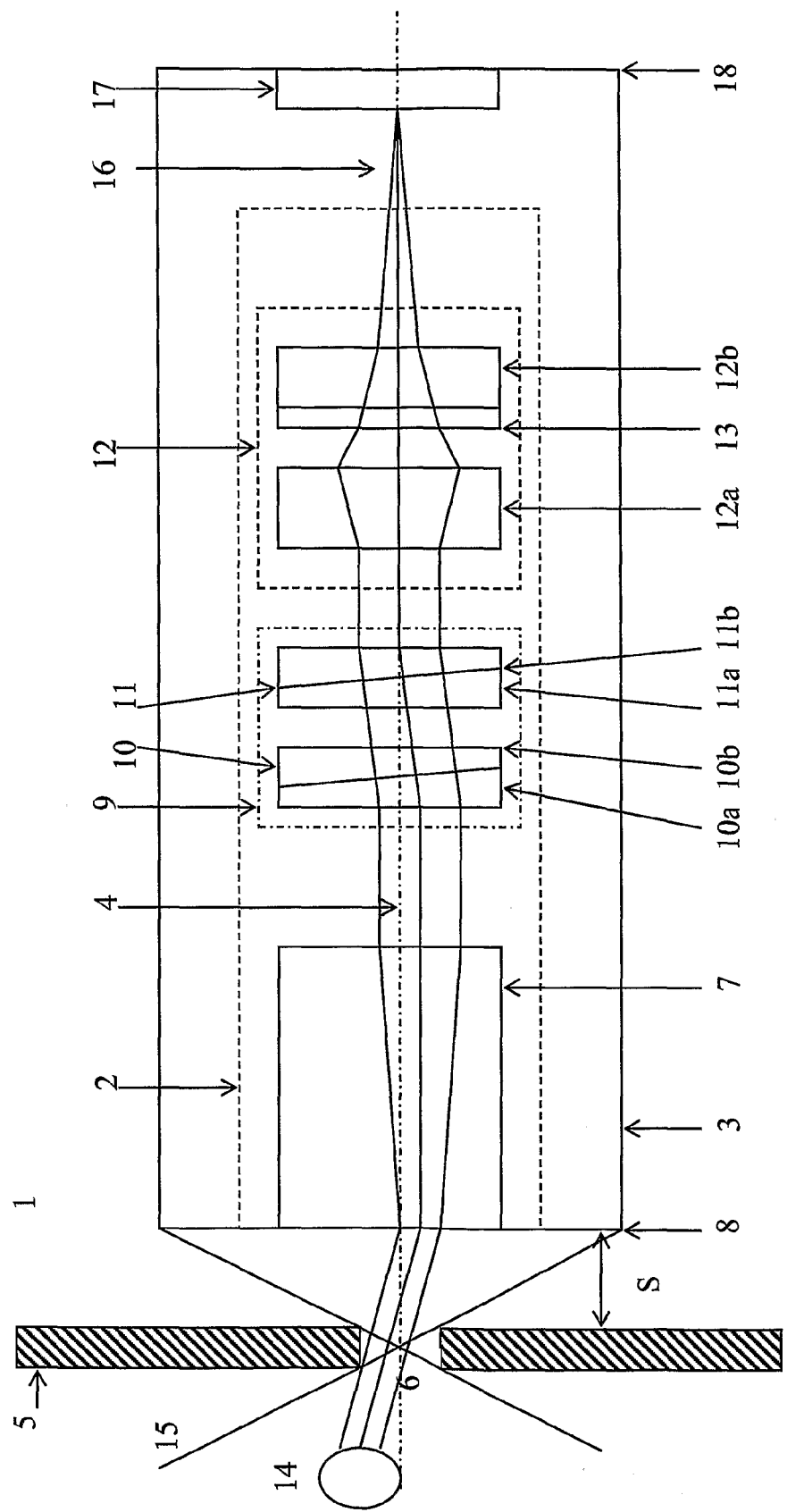
FIG. 3 shows a third cross section view of the camera of FIG. 1, displaying the effect of relative rotation of a Risley prism provided within the lens assembly.

FIGS. 1 to 3 shows the passage of an incident ray (16) from the subject (14) as it progresses through the hole (6) in the barrier (5) and the lens assembly (2) until it is brought into focus on an image receiving apparatus (17)—in this case an imaging sensor—located at the second end (18) of the camera (1) behind the lens assembly (2). FIG. 2 shows the effect of relative movement of the two groups of elements (12a, 12b) that comprise the zoom apparatus (12) on the incident ray (16). As can be seen from FIGS. 1 and 2, the subject (14) is located on the optical axis (4), i.e. the subject is located at the centre of the field of view (15). FIG. 3 shows relative rotation of the two wedge prisms (10, 11) which comprise the Risley prism (9) leading to the subject (14), which is now located away from the centre of the field of view, being apparently brought to the centre of the viewed image thereby enabling the subject to be enlarged or reduced in size through actuation of the zoom apparatus (12).

It will be understood that the example described above and shown in the drawings is an example of one embodiment of the invention only and should not be construed as limiting the scope of the invention.

It will be further understood that although this specification describes the apparatus and method of the invention in terms of visible light, its teaching may also be applied throughout the electromagnetic spectrum, for example with respect to infra-red radiation.

The invention claimed is:

1. A viewing apparatus comprising a first end for receiving incident light from within a field of view and being adapted to produce a focused image on an image plane at a second end of the viewing apparatus, the viewing apparatus further comprising one or more optical elements that may be moved so that light from anywhere within the field of view of the viewing apparatus can be redirected to the optical axis thus moving the field of view without moving the viewing apparatus itself, wherein the viewing apparatus comprises a relay lens group at the first end of the viewing apparatus operable in use to condition the light such that it is non-collimated to a degree prior to it being incident on the one or more optical elements.

2. A viewing apparatus as claimed in claim 1, wherein the relay lens group has a numerical aperture of less than or equal to 0.03.

3. A viewing apparatus as claimed in claim 1, wherein the relay lens group has a numerical aperture in the range from 0.017 to 0.03.

4. A viewing apparatus as claimed in claim 1, wherein the relay lens group has a numerical aperture in the range from 0.022 to 0.028.

5. A viewing apparatus as claimed in claim 1, wherein the viewing apparatus comprises a conditioning lens or group of lenses located in use between the one or more optical elements and the second end of the viewing apparatus and adapted such that in use it compensates for any aberrations introduced by the relay lens group or the one or more optical elements.

6. A viewing apparatus as claimed in claim 1, wherein the viewing apparatus further comprises a zoom apparatus for magnifying the image being viewed.

7. A viewing apparatus as claimed in claim 6, wherein a conditioning lens or group of lenses are incorporated in the zoom apparatus.

8. A viewing apparatus as claimed in claim 6, wherein the zoom apparatus comprises two or more groups of lens elements and is operable by linear relative movement between the two or more groups.

9. A viewing apparatus as claimed in claim 6, wherein the zoom apparatus comprises a solid state zoom lens.

10. A viewing apparatus as claimed in claim 6, wherein the zoom apparatus is detachable.

11. A viewing apparatus as claimed in claim 1, wherein the one or more optical elements comprise one or more Risley prisms.

12. A viewing apparatus as claimed in claim 11, wherein at least one of the Risley prisms comprises two wedge prisms, and wherein at least one of the wedge prisms comprises two or more elements, each element formed from a material of different refractive index.

13. A viewing apparatus as claimed in claim 1, wherein the viewing apparatus comprises an aperture stop.

14. A viewing apparatus as claimed in claim 13, wherein the aperture stop is provided within a zoom apparatus.

15. A viewing apparatus as claimed in claim 13, wherein the relay lens group is operable in use to project a real image of the aperture stop forwards from the first end of the viewing apparatus into object space thus producing an external entrance pupil.

16. A viewing apparatus as claimed in claim 15, wherein in use the real image of the aperture stop remains stationary relative to the viewing apparatus.

17. A viewing apparatus comprising a first end for receiving incident light from within a field of view and being adapted to produce a focused image on an image plane at a second end of the viewing apparatus, the viewing apparatus further comprising one or more optical elements that may be moved so that light from anywhere within the field of view of the viewing apparatus can be redirected to the optical axis thus moving the field of view without moving the viewing apparatus itself, wherein the viewing apparatus comprises a relay lens group at the first end of the viewing apparatus operable in use to condition the light such that it is non-collimated to a degree prior to it being incident on the one or more optical elements, wherein (i) the viewing apparatus comprises an aperture stop and (ii) the relay lens group is operable in use to project a real image of the aperture stop forwards from the first end of the viewing apparatus into object space thus producing an external entrance pupil at a distance in the range of 2 to 4 millimeters from the first end of the viewing apparatus.

18. A viewing apparatus comprising a first end for receiving incident light from within a field of view and being adapted to produce a focused image on an image plane at a second end of the viewing apparatus, the viewing apparatus further comprising one or more optical elements that may be moved so that light from anywhere within the field of view of the viewing apparatus can be redirected to the optical axis thus moving the field of view without moving the viewing apparatus itself, wherein the viewing apparatus comprises a relay lens group at the first end of the viewing apparatus operable in use to condition the light such that it is non-collimated to a degree prior to it being incident on the one or more optical elements, wherein (i) the viewing apparatus comprises an aperture stop, (ii) the relay lens group is operable in use to project a real image of the aperture stop forwards from the first end of the viewing apparatus into object space thus producing an external entrance pupil, and (iii) the viewing apparatus is in use contained within a housing, said housing having a hole therein, the viewing apparatus being arranged in the housing such that the real image of the aperture stop projected by the relay lens group is substantially coincident with the hole.

19. A method of viewing a subject through a hole comprising use of a viewing apparatus comprising a first end for receiving incident light from within a field of view and being adapted to produce a focused image on an image plane at a second end of the viewing apparatus, the viewing apparatus further comprising one or more optical elements that may be moved so that light from anywhere within the field of view of the viewing apparatus can be redirected to the optical axis thus moving the field of view without moving the viewing apparatus itself, wherein the viewing apparatus comprises a relay lens group at the first end of the viewing apparatus operable in use to condition the light such that it is non-collimated to a degree prior to it being incident on the one or more optical elements, wherein (i) the viewing apparatus comprises an aperture stop and (ii) the relay lens group is operable in use to project a real image of the aperture stop forwards from the first end of the viewing apparatus into object space thus producing an external entrance pupil, the viewing apparatus being arranged such that the real image of the aperture stop that is projected forwards by the relay lens group is substantially coincident with the hole.

20. A method as claimed in any claim 19, wherein the hole has a diameter in the range 0.3 to 1 millimeter.

21. A method as claimed claim 19, wherein the hole produces a relative aperture in the range F/7 to F/15.

* * * * *